United States Patent [19]
Krzykowski et al.

[11] Patent Number: 5,937,640
[45] Date of Patent: Aug. 17, 1999

[54] THERMAL MANAGEMENT SYSTEM FOR CATALYTIC CONVERTERS

[75] Inventors: Heinrich Z Krzykowski, Herdecke; Klemens Grieser, Langenfeld; Patrick Phlips; Thomas E Mayer, both of Cologne, all of Germany

[73] Assignee: Ford Global Technologies, Inc., Dearborn, Mich.

[21] Appl. No.: 08/988,463

[22] Filed: Dec. 10, 1997

[51] Int. Cl.$^6$ ........................................................ F01N 3/00
[52] U.S. Cl. ................................ 60/284; 60/288; 60/300; 60/323
[58] Field of Search ............................. 60/284, 288, 300, 60/323

[56] References Cited

U.S. PATENT DOCUMENTS

| | | |
|---|---|---|
| 3,744,248 | 7/1973 | Foster et al. . |
| 5,144,799 | 9/1992 | Barth ............................................ 60/323 |
| 5,331,810 | 7/1994 | Ingermann et al. ...................... 60/323 |
| 5,365,735 | 11/1994 | Weber et al. .............................. 60/323 |
| 5,384,098 | 1/1995 | Morikawa . |
| 5,444,978 | 8/1995 | Yoshizaki et al. ......................... 60/300 |
| 5,655,362 | 8/1997 | Kawajiri et al. ........................... 60/284 |
| 5,657,625 | 8/1997 | Koga et al. . |

*Primary Examiner*—Thomas E. Denion
*Attorney, Agent, or Firm*—James J. Dottavio

[57] ABSTRACT

A thermal management system for catalytic converters of an automotive internal combustion engine includes exhaust pipes from one bank of cylinders crossing over to a second side of the engine to a catalytic converter, while the exhaust pipe from the other bank of cylinders crosses over to the first side of the engine to connect to a corresponding catalytic converter, thereby resulting in a crosswise pattern of exhaust flow. Bypass pipes connect between the exhaust pipes of one bank of cylinders directly to the catalytic converter located on the same side of the engine to provide a short exhaust path to rapidly heat the converter.

14 Claims, 3 Drawing Sheets

THERMAL MANAGEMENT SYSTEM FOR CATALYTIC CONVERTERS

FIELD OF THE INVENTION

This invention relates to internal combustion engines for automotive vehicles having catalytic converters, and more particularly, to a thermal management system for such catalytic converters.

BACKGROUND OF THE INVENTION

Conventional exhaust pipe arrangements are designed so that the exhaust gases from each bank of cylinders pass through separate exhaust pipes to catalytic converters. However, these arrangements have the disadvantage that when temperature control is desired, such as rapid heating of the converters, it is not practical to provide a variable length exhaust path to the catalytic converter because of packaging issues.

OBJECT OF THE INVENTION

Accordingly, it is an object of the invention to provide an arrangement which avoids these disadvantages by providing an exhaust pipe with larger cross-section and considerable length combined with bypass pipes of smaller cross-section and shorter length for catalytic converter temperature control.

SUMMARY OF THE INVENTION

To achieve this object, the exhaust gases from cylinders on each side of a "V" type internal combustion engine are led by an exhaust manifold and an exhaust pipe the respective other side of the engine and to a catalytic converter, also located on said other side. A control valve unit is incorporated in each of the exhaust pipes by which the exhaust pipes can be shut off. In each case, a respective bypass pipe, having a substantially smaller cross-section than the exhaust pipes, is provided between the exhaust pipe of one bank of cylinders and the exhaust pipe of the other bank of cylinders. The bypass pipes connect the region of the exhaust pipes nearest to the exhaust manifold of the first bank of cylinders to a region near where the exhaust pipe for the second bank of cylinders opens into the respective catalytic converter, with the catalytic converter being located on the same side of the vehicle as the first bank of cylinders.

In this way, when rapid heating of the converter from one bank of cylinders is desired, the exhaust flow from this bank of cylinders is throttled and the exhaust gas is passed via a bypass pipe having a smaller cross-section directly to the exhaust pipe of the other bank of cylinders which opens directly into the respective converter. This same arrangement is provided for the other bank of cylinders. On the other hand, by routing the exhaust pipe of one bank of cylinders to the converter on the other side of the vehicle, the length of the exhaust pipe is increased in a desirable manner, thus increasing the cooling effect. However, the bypass pipes are kept desirably short.

If space is available in the vehicle, the exhaust pipes can be arranged behind the engine (from the point of view of direction of travel and seen from above). If, however, greater cooling during normal operation of the vehicle is required, the length of the exhaust pipes can be increased by arranging the exhaust pipes in front of the engine.

Advantageously, in both arrangements, the control valve units can be combined in one component. In addition, it is possible to combine the tailpipes at the end of the vehicle to form a single exhaust.

BRIEF DESCRIPTION OF THE DRAWINGS

Embodiments of the invention are illustrated in the drawings, in which.

DETAILED DESCRIPTION OF THE PREFERRED EMBODIMENTS

Figure 1:
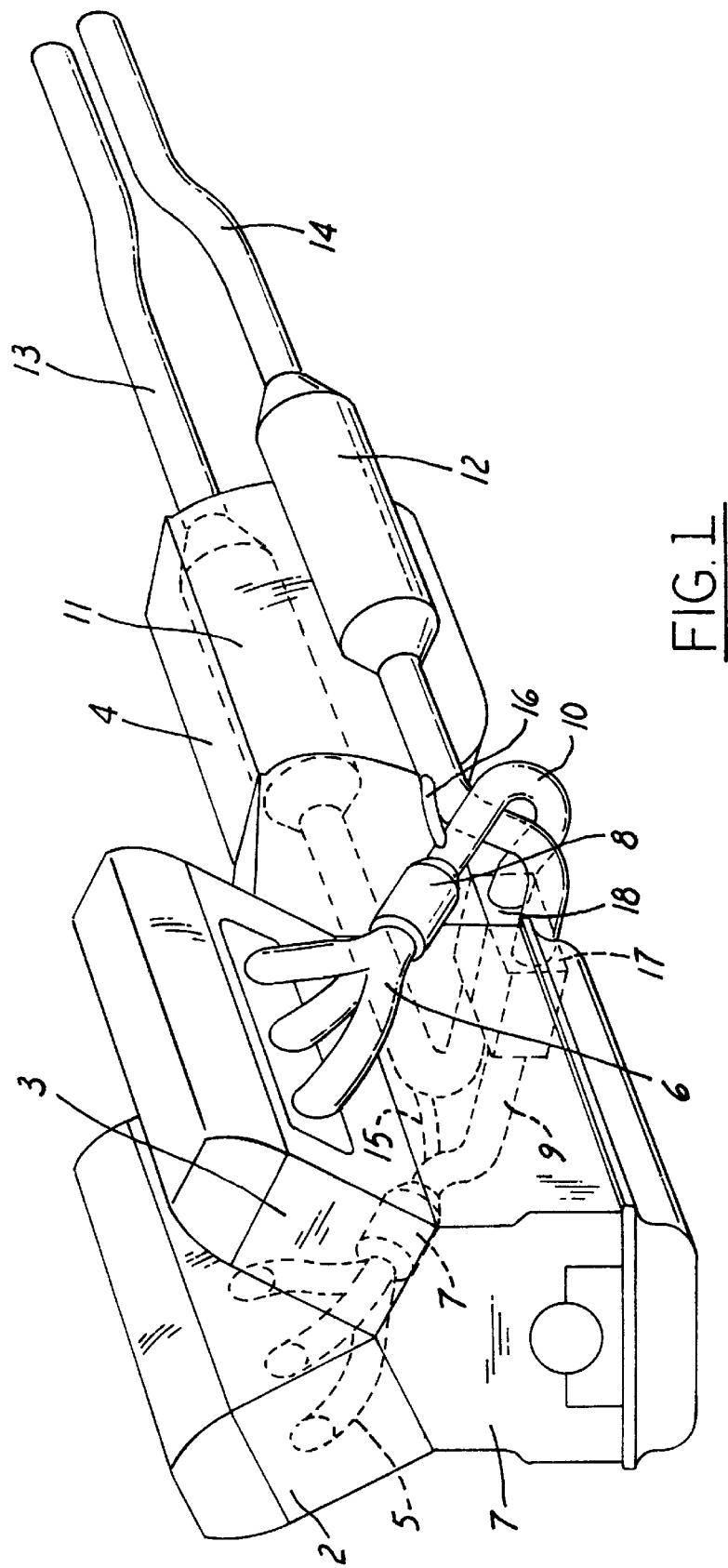
FIG. 1 is a perspective view of the exhaust arrangement of one embodiment according to the present invention.
Figure 2:
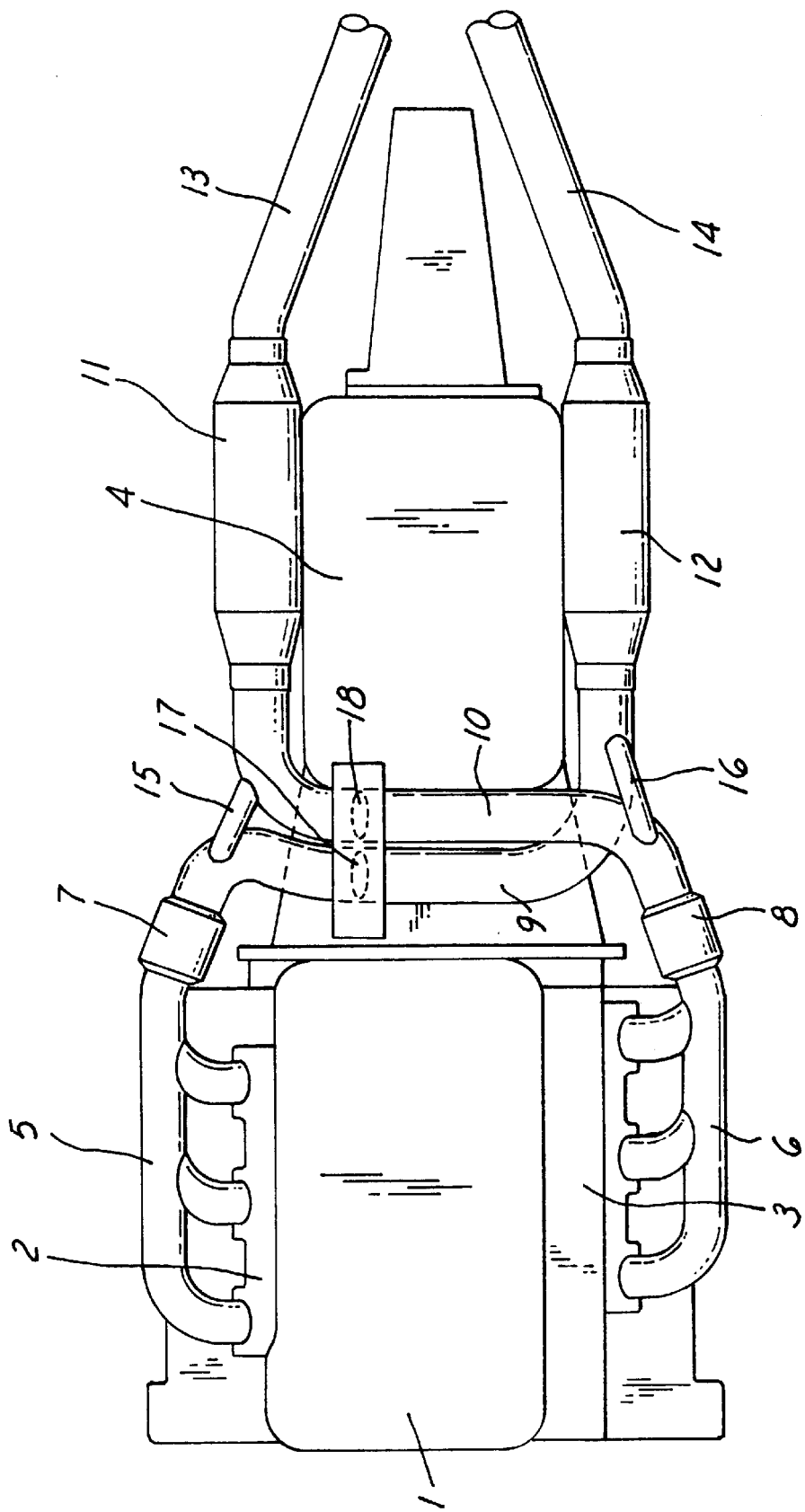
FIG. 2 is a plan view of the arrangement shown in FIG. 1.

In an exemplary embodiment of the invention illustrated particularly in FIGS. 1 and 2, internal combustion engine 1 includes cylinder banks 2 and 3, thereby shown in a "V" configuration and mounted in a vehicle (not shown) in a North-South configuration. A gear box 4 is located behind the engine 1 (south side). The exhaust gases from the engine 1 passes through exhaust manifolds 5 and 6, through coupling elements 7 and 8, to exhaust pipes 9 and 10, respectively.

The exhaust pipes 9 and 10 for the respective banks of cylinders 2 and 3 may run behind the engine (south side) to the other side of the engine 1 and then enter a respective catalytic converter 11 and 12 located on that side. The route of the exhaust pipes 9 and 10 is preferably below the engine 1 and gearbox 4. Those skilled in the art will recognize in view of this disclosure that a different engine layout, such as a transverse (east-west)mounted engine, may be used. In this case, the relative length of the main exhaust pipes 9 and 10 will be adjusted accordingly. In the embodiment shown in FIGS. 1 and 2, control valve units 17 and 18, respectively, which may be used to throttle exhaust flow in pipes 9 and 10 for temperature control in order to achieve rapid heating of the converters, for example, are arranged behind engine 1. Bypass pipes 15 and 16, are used as a short heat path to direct heated exhaust gas to converters 11 and 12, respectively. Bypass pipes 15 and 16 connect a region of pipes 9 and 10 near exhaust manifolds 5 and 6 of each bank of cylinders 2 and 3 to the exhaust pipe which is associated with the other bank of cylinders. Accordingly, the exhaust gases are led through the exhaust pipes from a manifold on one side of the engine to a converter on the opposite side of the engine, while the bypass pipe forms a direct and short path from the manifold on one side of the vehicle to the converter on the same side, with this converter being the main converter corresponding to the bank of cylinders on the opposite side of the engine.

Figure 3:
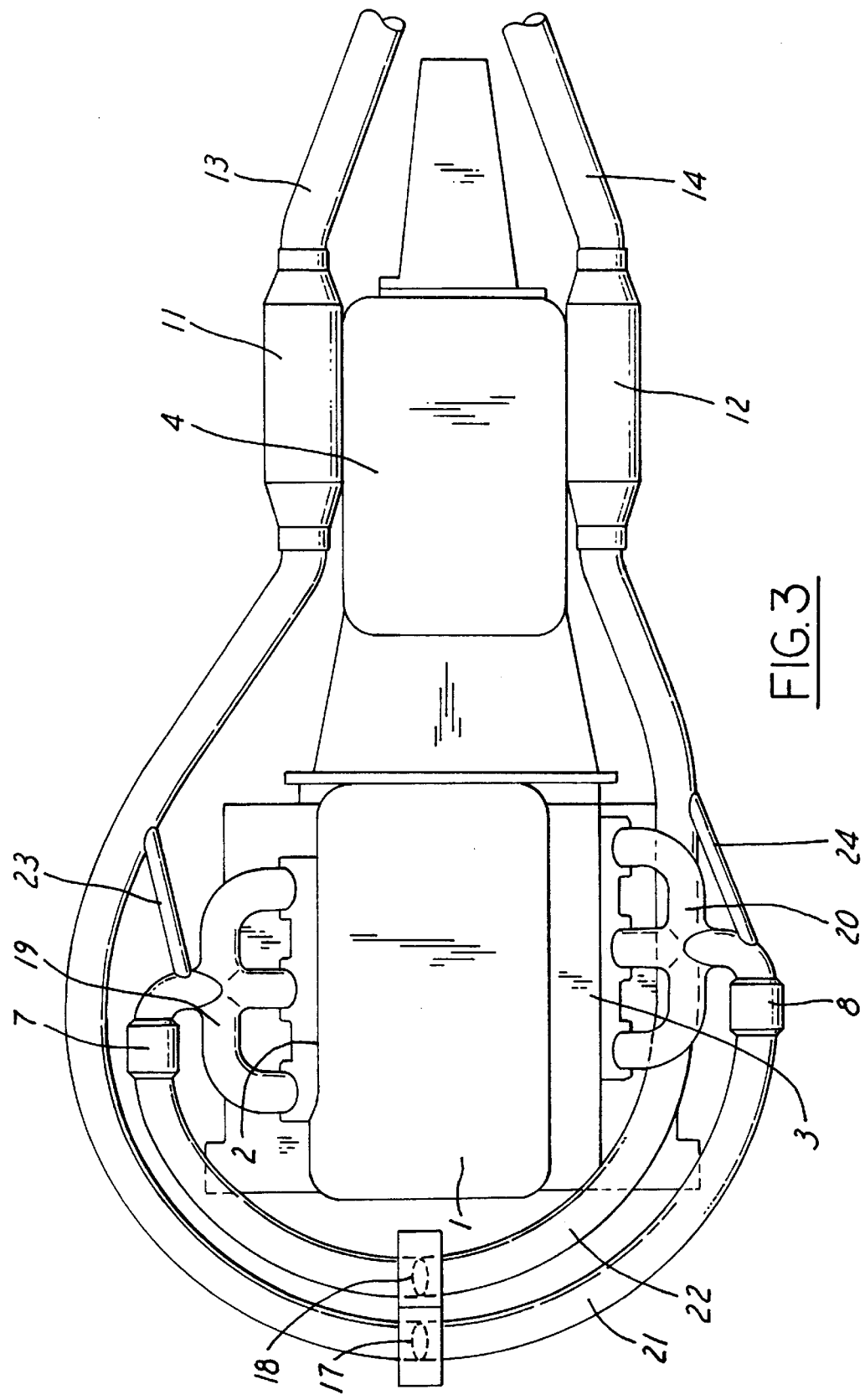
FIG. 3 is a plan view of another embodiment according to the present invention.

In another exemplary embodiment of the invention, as shown in FIG. 3, exhaust pipes 21 and 22 are coupled to exhaust manifolds 19 and 20 and pass in front (north side) of the engine to the opposite side, where they are coupled to a respective converter on that side of the engine. As described with reference to FIGS. 1 and 2, bypass pipes 23 and 24 are coupled to pipes 21 and 22 to feed exhaust gas from one bank of cylinders to the catalytic converter corresponding to the other bank of cylinders for rapid heating. In addition, control valve 17 and 18 may be located in front of engine 1.

Bypass pipes 15, 16 and 23 and 24 are substantially shorter in length than exhaust pipes 5, 6, and 21, 22, and the bypass pipes have a substantially smaller cross-section than the exhaust pipe. In addition, exhaust pipes 13 and 14 may be joined to form a common exhaust.

While the best mode for carrying out the invention has been described in detail, those skilled in the art in which this invention relates will recognize various alternative designs and embodiments, including those mentioned above, in practicing the invention that has been defined by the following claims.

We claim:

1. A thermal management system for catalytic converters of a multi-cylinder internal combustion engine, with said system comprising:
    a first main exhaust pipe coupled between a first set of cylinders and a first catalyst;
    a second main exhaust pipe coupled between a second set cylinders and a second catalyst;
    a first bypass exhaust pipe coupled between said first main exhaust pipe and said second catalyst, with said first bypass pipe being relatively shorter than said main exhaust pipes; and,
    a second bypass exhaust pipe coupled between said second main exhaust pipe and said first catalyst, with said second bypass pipe being relatively shorter than said main exhaust pipes.

2. A thermal management system according to claim 1 further comprising control valves for controlling flow of exhaust gas between said main exhaust pipes and said bypass exhaust pipes.

3. A thermal management system according to claim 1 further comprising control valves coupled to said first and second main exhaust pipes, respectively, for controlling flow of exhaust gas between a respective main exhaust pipe and a respective bypass exhaust pipe.

4. A thermal management system according to claim 1 wherein the engine is disposed in a "V" arrangement, with said first exhaust pipe being coupled to a first bank of cylinders and with said second exhaust pipe being coupled to a second bank of cylinders, with the first bank defining a first side of the engine and the second bank defining a second side of the engine.

5. A thermal management system according to claim 4 wherein said main exhaust pipes cross from a respective side of the engine to a respective catalyst on an opposite side of the engine.

6. A thermal management system according to claim 1 wherein said bypass exhaust pipes have a substantially smaller cross-section than said main exhaust pipes.

7. A thermal management system according to claim 1 wherein said engine is arranged in a North-South configuration thereby defining a North and South side, with said main exhaust pipes crossing the engine on the South side.

8. A thermal management system according to claim 1 wherein said engine is arranged in a North-South configuration thereby defining a North and South side, with said main exhaust pipes crossing the engine on the North side.

9. A thermal management system according to claim 3 wherein said control valves are combined within an integral component.

10. A thermal management system for catalytic converters of a multi-cylinder internal combustion engine, the engine being disposed in a "V" arrangement thereby having a first bank of cylinders, defining a first side of the engine, and a second bank of cylinders, defining a second side of the engine, with said system comprising:
    a first main exhaust pipe coupled between the first bank of cylinders and a first catalyst, with said first catalyst being disposed on the second side of the engine;
    a second main exhaust pipe coupled between a second bank of cylinders and a second catalyst, with said second catalyst being disposed on the first side of the engine;
    a first bypass exhaust pipe coupled between said first main exhaust pipe and said second catalyst, with said first bypass pipe being relatively shorter than said main exhaust pipes;
    a second bypass exhaust pipe coupled between said second main exhaust pipe and said first catalyst, with said second bypass pipe being relatively shorter than said main exhaust pipes; and
    control valves coupled to said first and second main exhaust pipes, respectively, for controlling flow of exhaust gas between said main exhaust pipes and said bypass exhaust pipes.

11. A thermal management system according to claim 10 wherein said first by-pass exhaust pipe is disposed on the first side of the engine and wherein said second by-pass exhaust pipe is disposed on the second side of the engine.

12. A thermal management system according to claim 10 wherein said bypass exhaust pipes have a substantially smaller cross-section than said main exhaust pipes.

13. A thermal management system according to claim 10 wherein the engine is arranged in a North-South configuration thereby defining a North and South side, with said main exhaust pipes crossing the engine on the South side.

14. A thermal management system according to claim 10 wherein said engine is arranged in a North-South configuration thereby defining a North and South side, with said main exhaust pipes crossing the engine on the North side.

* * * * *